March 7, 1933.   L. J. WILCOX   1,900,533
AUTOMATIC PRESSURE RELEASE GAUGE
Filed June 10, 1931

INVENTOR.
L. J. WILCOX
BY M. Talbert Dick
ATTORNEY.

Patented Mar. 7, 1933

1,900,533

UNITED STATES PATENT OFFICE

LELAND JAY WILCOX, OF ADEL, IOWA

AUTOMATIC PRESSURE RELEASE GAUGE

Application filed June 10, 1931. Serial No. 543,292.

The principal object of my invention is to provide a novel pressure gauge for the control of air pressures inside containers such as automotive vehicle tires, that eliminates the possibility of over-inflation when filling or refilling the tires.

More specifically, the object of this invention is to provide a device that is attachable to the end of an air supply tube and capable of releasing the air pressure at the stem of the tire when the tire is properly inflated.

A further object of my invention is to provide an automatic pressure release gauge for the ends of air supply tubes that may be easily and quickly adjusted to actuate at any desired predetermined pressure.

A still further object of this invention is to provide an automatic pressure release gauge that is economical in manufacture and durable in use.

These and other objects will be apparent to those skilled in the art.

My invention consists in the construction, arrangement and combination of the various parts of the device, whereby the objects contemplated are attained, as hereinafter more fully set forth, pointed out in my claims and illustrated in the accompanying drawing, in which:

There are many types of pressure gauges now on the market for testing the pressure in tires. These gauges, however, are used independently for testing the pressure at different times. When inflating a tire it is necessary to remove the air supply tube from the valve barrel from time to time to ascertain if desirable pressure has been reached. Often a test will reveal a dangerously excess amount of pressure. I have overcome such objections by providing an adjustable automatic pressure releasing gauge for the outlet ends of air pressure supply tubes.

Figure 1:
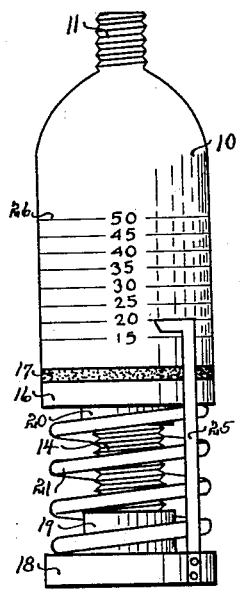
Fig. 1 is an enlarged side view of my complete invention not in use.
Figure 3:
Fig. 3 is a side view of the opening and closing washer of the invention.

Referring to the drawing, I have used the numeral 10 to designate the body and base portion of the invention. This body portion 10 is of hollow construction and has a threaded inlet stem 11 at its top, as shown in Fig. 1. This hollow inlet stem 11 is designed to extend into the outlet end of a flexible hose 12 which is in communication with a source of air under pressure.

Figure 4:
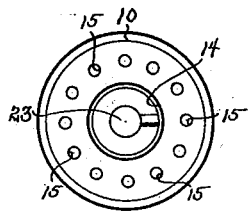
Fig. 4 is a bottom view of the base portion of the invention and shows the air escape holes.

The hose 12 may be tightly secured on the stem 11 by any suitable means such as a metallic collar 13. The numeral 14 designates a hollow downwardly extending stem formed at the center of the flat bottom of the body member 10 and communicating with the inside of that member. The numeral 15 designates a plurality of evenly spaced apart air escape ports in the bottom of the body 10 and arranged around the stem 14, as shown in Fig. 4. Slidably mounted on the stem 14 is the port opening and closing washer 16. Secured by suitable means such as glue or the like on the top of this washer 16 is a resilient gasket 17 capable of engaging and closing the ports 15 when the washer 16 is moved to its extreme upward movement on the stem 14. Threaded on the lower end portion of the stem 14 is a nut 18 having an upwardly extending boss 19 at its center similar to the downwardly extending boss 20 at the center portion of the washer 16. The numeral 21 designates a coil spring embracing the stem 14, having its lower end engaging the top surface of the nut 18 and its upper end engaging the lower face of the washer 16.

By this arrangement, the gasket 17 will yieldingly be held for closing the ports 15 at all normal times.

To inflate a tire or container it is merely necessary to place the lower end of the stem 14 in the usual manner onto the inlet end of the usual valve barrel or stem 22 which communicates with the inside of the tire or container. The projection 23 inside the lower end portion of the stem 14, as shown by cutaway portion in Fig. 2, depresses the valve stem 24 in the valve barrel 22, thereby permitting air from the air supply hose 12 to pass into the body 10, thence into the stem 14 and then into the valve barrel 22, from which it passes on into the tire or container.

Figure 2:
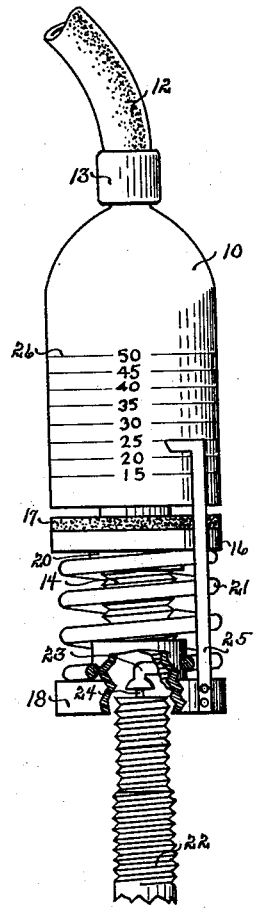
Fig. 2 is an enlarged side view of the device in use and in the act of releasing excessive and undesirable pressure at the top of a tire stem.
Figure 5:
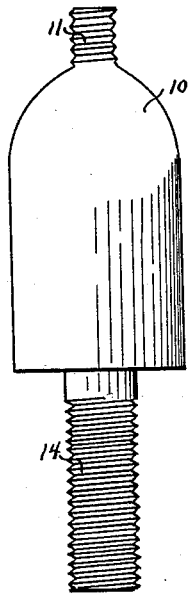
Fig. 5 is a side view of the base portion of the invention with all movable parts removed.

Naturally, as the usual valve in the barrel 22 is in an open condition, communication will exist between the inside of the container or tire and the inside of the body member 10. As the pressure increases inside the tire or container, this pressure will to a like extent influence the pressure inside the body member 10. When this pressure inside the body member 10 becomes sufficiently great it will pass through the escape ports 15 by forcing the washer 16 downwardly against the tension of the coil spring 21. The pressure inside the member 10, sufficient to move the washer 16 downwardly, will be proportional to the tension of the spring 21, which is regulated by rotating the nut 18. If a greater amount of pressure is desired before the escape ports 15 are in an open condition the nut 18 should be rotated upwardly onto the stem 14, thereby compressing and increasing the tension of the spring 21. To rotate the nut 18 to the left and downwardly on the stem 14 will permit the coil spring 21 to expand and more lightly hold the washer 16 in an elevated condition for enclosing the ports 15, as shown in Fig. 1. With the air escape ports 15 in an open condition, as shown in Fig. 2, no further air will be forced into the valve barrel or stem 22, but will escape through the ports 15. This escaping of the air through the ports 15 will produce an audible sound, which will warn the operator that sufficient air has passed into the tire or container to properly inflate it and at that time he should remove the member 14 in the usual manner from the member 22.

Naturally, the various distances that the nut 18 is from the member 10 will designate the various pressures required to open the air escape ports 15. To accurately read this position of the nut 18 relative to the member 10 I have provided a pointer bar 25 which is secured to the nut 18 and extends upwardly to read on a scale 26 on the side of the member 10, as shown in Fig. 1.

This scale 26 may represent in figures, the pressure in pounds per square inch necessary to move the washer 16 downwardly and open the ports 15. By this construction it is merely necessary to rotate the nut 18 to a position where the pointer 25 reads on the pressure desired to be had in the tire or container. When this desired pressure is reached in the tire or container the ports 15 will be opened and it will be impossible to force more air into the tire or container.

The bosses 19 and 20 properly extend into the ends of the spring 21 and hold it from undesirable engagement with the threaded portion of the stem 14 when it is being actuated. As soon as the invention is removed from the barrel 22 the valve inside the same will, as is well known, close the the barrel 22 and prevent any escape of air from the tire or container.

Although I have designated my invention as particularly adapted to the inflating of automotive vehicle tires, it may be used to equal advantage in many other situations.

From the foregoing, it will be seen that I have provided an automatic pressure release gauge that is easy and quick of adjustment and accurate in operation.

If it is desired to permanently leave the invention on the valve barrel 22, the pressure valve in the barrel should be removed and threaded into the member 11 of the invention. When the device is used in this manner it will automatically relieve any excess amount of pressure in the vehicle tires caused by temperature expansion while the vehicle is in motion. It will also continue to function in the preventing of an excess amount of air pressure to be placed in the tire when being inflated.

Some changes may be made in the construction and arrangement of my improved automatic pressure release gauge without departing from the real spirit and purpose of my invention, and it is my intention to cover by my claims any modified forms of structure or use of mechanical equivalents which may be reasonably included within their scope.

I claim:

1. In a device of the class described, a hollow member having an opening and a flat bottom flush with its side walls, a hollow stem secured to the center of said bottom and communicating with the inside of said hollow member, said stem having an outer end portion; said bottom having a plurality of air escape ports arranged around said stem, a washer slidably mounted on said stem, a resilient member on said washer capable of closing said ports when said washer is moved toward said hollow member, a nut threaded onto the outer end portion of said stem, and a coil spring embracing said stem having one end engaging said washer and its other end engaging said nut.

2. In a device of the class described, a hollow member having an opening and a flat bottom flush with its side walls, a hollow stem secured to the center of said bottom and communicating with the inside of said hollow member, said stem having an outer end portion; said bottom having a plurality of air escape ports arranged around said stem, a washer slidably mounted on said stem, a resilient member on said washer capable of closing said ports when said washer is moved toward said hollow member, a nut threaded onto the outer end portion of said stem, a coil spring embracing said stem having one end engaging said washer and its other end engaging said nut, indicia on said hollow member, and a pointer secured to said nut and reading on said indicia.

LELAND JAY WILCOX.